| United States Patent [19] | [11] Patent Number: 4,477,596 |
| Fujimoto | [45] Date of Patent: Oct. 16, 1984 |

[54] AMPHOTERIC ION EXCHANGER AND METHOD OF MAKING SAME

[75] Inventor: Teruo Fujimoto, Nagaoka, Japan

[73] Assignee: Toyo Soda Manufacturing Co., Ltd., Yamaguchi, Japan

[21] Appl. No.: 371,311

[22] Filed: Apr. 23, 1982

[30] Foreign Application Priority Data

Oct. 30, 1981 [JP] Japan .................................. 56-173810

[51] Int. Cl.$^3$ .............................................. B01J 43/00
[52] U.S. Cl. ........................................ 521/25; 521/27; 521/38
[58] Field of Search .......................... 521/25, 27, 28, 38

[56] References Cited

U.S. PATENT DOCUMENTS 3,657,201  4/1972  Takeya .................................... 521/38
3,770,712  11/1973  Schwab .................................. 521/30
4,365,023  12/1982  Fujimoto et al. ....................... 521/38

OTHER PUBLICATIONS

Polymer Preprints, Japan, vol. 30, No. 1, 2, 3, Fujimoto et al, May 1, 1981.

*Primary Examiner*—Joseph L. Schofer
*Assistant Examiner*—Peter F. Kulkosky
*Attorney, Agent, or Firm*—Armstrong, Nikaido, Marmelstein & Kubovcik

[57] ABSTRACT

An amphoteric ion exchanger constituted by linking (1) first macromolecular chain $A^-$ having cation exchange groups, (2) second macromolecular chain $B^+$ having anion exchange groups and (3) third macromolecular chain C having no ion exchange group into a straight chain to have a linking mode of the first chain and the second chain being separated from each other by the third chain.

14 Claims, 6 Drawing Figures

Meniscus     Bottom

Elution Time (min)

0.1 μm 0.5 μm 0.5 μm

AMPHOTERIC ION EXCHANGER AND METHOD OF MAKING SAME

BACKGROUND OF THE INVENTION

This invention relates to an amphoteric ion exchanger made of a straight-chain multi-block copolymer which is composed of a macromolecular chain $A^-$ having a cation exchange group, a macromolecular chain $B^+$ having an anion exchange group and another macromolecular chain C having no ion exchange group with these constituent chains bonded in such a manner that the chains $A^-$ and $B^+$ are separated from each other by the chain C.

Materials that simultaneously have cation and anion exchange groups have been developed as mosaic amphoteric ion exchange membrane to be used mainly for making sea water into fresh water by piezo-dialysis or salt concentration thereof. Known methods for obtaining such an amphoteric ion exchange membrane include the use of a blend of two or more kinds of homopolymers, a binary or ternary block copolymer, a blend of two kinds of random copolymers, a blend of a block copolymer and a homopolymer, etc.

Normally, mixing a macromolecule having a positive fixed electric charge (poly-cation) and a macromolecule having a negative fixed electric charge (poly-anion) gives a complex of macromolecular electrolyte (a poly-ion complex).

In such a case, the function expected of an amphoteric ion exchanger disappears and the poly-ion complex thus obtained is not usable as membrane material for the above stated piezo-dialysis. Therefore, generally, in obtaining an amphoteric ion exchanger either from a polymer blend or from a block copolymer, first a homopolymer or a block copolymer having no ion exchange group is shaped as desired and then cation and anion exchange groups are introduced. In this case, as well known, macromolecules of different kinds or constituent macromolecules of different kinds forming a block copolymer do not mix with each other and stay in their own domains. It is possible to obtain a desired amphoteric ion exchanger by introducing cation and anion exchange groups into the respective domains of such a material. Known amphoteric ion exchangers that have been obtained in this manner include:

(1) A blend of poly-styrene and poly(2-vinyl pyridine).
(2) A block copolymer of styrene and 2-vinyl styrene.
(3) A ternary block copolymer consisting of styrene, 2-vinyl pyridine and methyl methacrylate which are combined in that order.
(4) A blend consisting of a random copolymer of styrene and isoprene and a random copolymer of 2-vinyl pyridine and isoprene.
(5) A ternary block copolymer consisting of styrene, p-vinyl benzyl dimethyl amine and isoprene which are combined in that order.
(6) A ternary block copolymer consisting of isoprene, 2-vinyl pyridine and t-butyl acrylate which are combined in that order.

NOTE
(1)–(4): OSW R & DP Report No. 689
(5)–(6): A Japanese Patent Application, Laid Open No. 56-76408

Among the monomers mentioned above, the styrene permits introduction of a cation exchange group by sulfonation thereof; and the methyl methacrylate and the t-butyl acrylate permit introduction of a cation exchange group by hydrolysis. Meanwhile, the 2-vinyl pyridine and the p-vinyl benzyl dimethyl amine permit introduction of an anion exchange group by quaternization. Further, it has been attempted to enhance the strength of the membrane by crosslinking the isoprene portion thereof.

With the polymer blends and block copolymers employed in accordance with the conventional known method, however, the strength of the material is insufficient. Therefore, swelling by a solvent or the like tends to cause pinholes or cracks either during the introduction of the ion exchange group or after the introduction thereof. In some worse cases, the whole membrane comes to collapse. According to the experiences of the present inventors, even if such a trouble can be avoided with an ordinary binary or ternary block coplymer, there still might take place a change in the micro-phase separated structure to make it difficult to obtain a sufficiently stable performance as amphoteric ion exchanger for some applications.

In each of the above stated block copolymers, a block consisting of monomer units which introduce a cation exchange group and a block consisting of monomer units which introduce an anion exchange group are adjacently interbonding. Naturally, in their micro-phase separated solid state, a domain introducing a cation and a domain introducing an anion are considered adjoining each other.

Generally, a thin compatible region is formed at an interface between two domains consisting of different micro-phase separated monomer units. Therefore, introduction of a cation and an anion gives a polyion complex formed at the interfacial region. It is readily conceivable that a function as amphoteric ion exchanger greatly degrades in such a case.

SUMMARY OF THE INVENTION

The present invention is directed to the elimination of the above stated shortcomings of the conventional amphoteric ion exchangers. It is, therefore, an object of the invention to provide an amphoteric ion exchanger consisting of a multi-block copolymer which has improved strength and prevents the formation of the polyion complex therein. It is another object of the invention to provide a method of manufacturing the above stated amphoteric ion exchanger.

These and further objects, features and advantages of the invention will become apparent from the following detailed description of the embodiment examples thereof taken in connection with the accompanying drawings.

BRIEF DESCRIPTION OF THE DRAWINGS

All the accompanying drawings relate to the embodiment examples of the invention.

DETAILED DESCRIPTION OF THE INVENTION

Figure 1:
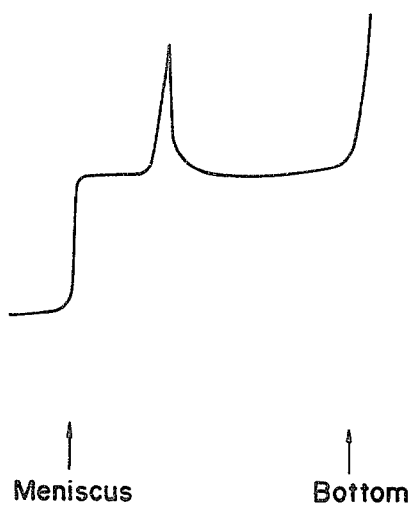
FIG. 1 is an illustration of an ultra-centrifugal sedimentation pattern of a CACBC type block copolymer T-3 obtained by a schlieren optical system.

The amphoteric ion exchanger according to the invention consists of a multi-block copolymer which is composed of a macromolecular chain $A^-$ having a cation exchange group, a macromolecular chain $B^+$ having an anion exchange group and a macro-molecular chain C having no ion exchange group and in which these constituent chains are linked into a straight chain with the chains $A^-$ and $B^+$ separated from each other by the chain C. The invention uses as material an original multi-block copolymer consisting of a macromolecular block A which is capable of having a cation exchange group therein, a macro-molecular block B which is capable of having an anion exchange group and a macro-molecular block C which is incapable of having any ion exchange group therein. The blocks A and B are separated and prevented from adjoining each other by the block C while these blocks are linked in a straight chain-like state. The amphoteric ion exchanger of the invention is obtained from this original multi-block copolymer through a step of introducing a cation exchange group into the macro-molecular block A to make it into the macro-molecular chain $A^-$ which has the cation exchange group; another step of introducing an anion exchange group into the macro-molecular block B to make it into the macro-molecular chain $B^+$ which has the anion exchange group; and a further step of crosslinking the macro-molecular block C to make it into the macro-molecular chain C which has no ion exchange group.

In the above stated original multi-block copolymer, the block A which consists of monomer units permitting introduction of a cation exchange group and the block B which consists of monomer units permitting introduction of an anion exchange group are not adjoining each other and always have the block C which is incapable of introducing any ion exchange group interposed in between them. The simplest multi-block copolymer of this type is a ternary block copolymer having a block array of the ACB type. Multi-block copolymers of other block arrays such as CACB, ACBC, CACBC, BCACBC, CACBCA, CBCACBC, CACBCAC, etc. are also usable.

In the original multi-block copolymer according to the invention, since the block A which permits introduction of a cation exchange group and the block B which permits introduction of an anion exchange group are separated from each other by the block C which permits introduction of no ion exchange group in one molecular chain, when an aggregate of them is molded into a desired shape, the shaped aggregate can be arranged into a micro-phase separated structure wherein a domain consisting of segments which permit introduction of a cation exchange group and a domain consisting of segments which permit introduction of an anion exchange group are separated from each other within a matrix consisting of segments which do not permit introduction of any ion exchange group. Then, by introducing cation and anion exchange groups into a material that has such a micro-phase separated structure, it is possible to obtain an amphoteric ion exchanger which forms no poly-ion complex.

Further, in the case of an original multi-block copolymer of the CACBC type having blocks which do not allow introduction of any ion exchange group disposed at both ends of the molecular chain thereof, for example, it has been found that the copolymer material has greater strength than the ternary block copolymer of the ACB type and is less deformed by swelling of a solvent than the ACB type though the micro-phase separated structure of the former is the same as that of the latter. When a crosslinking process is applied to the domains formed by blocks C of a multi-block copolymer in which the both ends of the molecular chain are blocks C, the whole material is naturally combined by covalent bond irrespective of the shape of the micro-phase separated structure taken by the domains, such as a lamellar shape, a cylindrical shape, a spherical shape, etc. Then, a great increase can be expected in the strength of the material. This condition never can be expected from a block copolymer in which the ends of the molecular chain is A or B blocks unless crosslinking is applied also to the domains formed by the A or B blocks.

When an original multi-block copolymer, in which the blocks A and B are separated by the block C and both ends of the molecular chain are blocks C, is employed, it is possible to obtain an amphoteric ion exchanger in which an anion domain and a cation domain are separated from each other by a neutral domain and which excels in strength. Besides, the degree of a change that takes place in the shape of the whole material or in the micro-structure thereof when cation and anion exchange groups are introduced into the original multi-block copolymer can be lowered to a great extent.

In practicing the present invention, monomers which have been carefully and thoroughly dehydrated and purified are block copolymerized one by one by living anion polymerization in a reaction solvent which has been also thoroughly dehydrated and purified, to obtain an original multi-block copolymer which has narrow distribution of molecular weight and has the array mentioned in the foregoing. Of the above stated three kinds of blocks, the block A which permits the introduction of cation exchange groups must be such a block that readily permits introduction of carboxylic acid groups or sulfonic acid groups or phosphoric acid groups or the like after polymerization. As for the kind of the monomer which constitutes the cation exchange group introducing block, the monomer may be selected from the group consisting of an unsaturated carboxylic acid ester (such as acylic acid ester, methacrylic acid ester, crotonic acid ester, conjugated dienes having carboxylic ester group or groups); a monomer having a cyano group such as acrylonitrile, methacrylonitrile, vinylidene cyanide, etc.; alkylidene malonic acid esters; $\alpha$-cyano acrylic acid ester; and so on. All of these monomers form carboxyl groups through hydrolysis. Further, the monomer may be styrene, $\alpha$-methyl styrene or vinyl toluene which can be sulfonated by a known method without difficulty. The block B which permits introduction of an anion exchange group must be such a block that permits introduction thereto a functional group such as an ammonium group, a sulfonium group, a phosphonium group or the like. The functional groups are obtained by quaternizing the polymers of vinyl pyridines which are vinyl compounds having heterocyclic rings containing nitrogen atoms (such as 2-vinyl pyridine, 4-vinyl pyridine, 2-methyl-5-vinyl pyridine, etc.); vinyl pyrimidine, vinyl quinoline, vinyl carbazole; vinyl imidazole; or series of styrene derived amines such as o,m,p-vinyl benzyl alkyl amine expressed by;

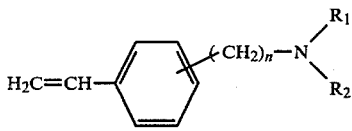

(wherein n=1-3 and $R_1$ and $R_2$ represent alkyl groups of carbon numbers 1-12).

Further, the anion exchange groups can be introduced also by quaternizing polymers of a series of alkyl amino acrylates expressed by:

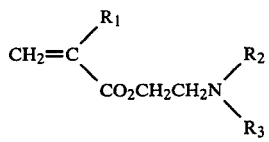

(wherein $R_1$ represents hydrogen or an alkyl group of carbon numbers 1-12; and $R_2$ and $R_3$ respectively represent alkyl groups of carbon numbers 1-12) or a series of dialkyl acrylic amides expressed by:

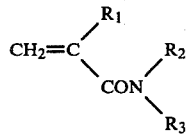

(wherein $R_1$ represents hydrogen or an alkyl group of carbon numbers 1-12 and $R_2$ and $R_3$ respectively represent acryl groups of carbon numbers 1-12).

The kind of the monomer to be used for forming the block C which does not introduce any ion exchange group thereto is preferably selected from diene monomers such as butadiene, isoprene, pentadiene, cyclohexadiene, etc. The block not introducing ion exchange groups may be a copolymer of more than two kinds of these monomers. Further, when the block not introducing ion exchange group is included more than twice within a block copolymer, these blocks may be composed of either different kinds of monomers or different monomer arrangement.

In the case of a sample where the neutral block is thus composed of the diene monomer, the sample permits crosslinking by a known process with a peroxide, sulfur, sulfur monochloride or concentrated sulfuric acid.

Where the multi-block copolymer according to the invention contains, more than twice, blocks consisting of the same monomer unit (for example, CACBC, CACB, etc.), the molar weight of one of such blocks does not have to be the same as that of another. The molecular weight of each block can be independently controlled.

The molar weight of each block constituting the multi-block copolymer according to the invention is preferably $10^3$ to $10^6$ g/mol and more preferably $10^4$ to $5 \times 10^5$ g/mol. As well known, in a block copolymer, the percent by volume of an interfacial region between two domains formed by micro-phase separation increases according as molecular weight decreases. In the case of a sample of low molecular weight, therefore, the effect of separating an anion domain from a cation domain by virtue of micro-phase separation lowers. For example, in a block copolymer of styrene and isoprene wherein the molecular weight of a styrene block is about five times as much as that of isoprene, the percent by volume of the interfacial region increased from 3% to 19% when the molecular weight of the isoprene block is decreased from $1.4 \times 10^5$ to $1.3 \times 10^4$ as known from "Macromolecules," 13, 1660 (1980), T. Hashimoto, et al. Further, it seems that there takes place no formation of phase separated structure at a molecular weight of $10^3$ or thereabout. In the case of a sample of a large molecular weight on the other hand, one of the phase separated domains increases in size. Therefore, when the sample is swelled by a solvent, a difference in swelling degree between the domains increases and tends to cause flaws such as cracks in the material. From such known facts together with the experiences of the present inventors, the most practical molecular weight per block for the material of an amphoteric ion exchanger is determined at $10^4 - 5 \times 10^5$ g/mol.

In the composition of the original multi-block copolymer, the percent by weight of the segment forming the neutral block which does not introduce any ion exchange group is 30 to 90%. Meanwhile, the percent by weight of each of the segments forming the cation exchange group introducing block A and the anion exchange group introducing block B must be at least 5%, because: Generally, in the case of a binary or ternary block copolymer which has 30% by weight or less of a diene neutral segment as component, an attempt to increase the strength of the block copolymer by crosslinking the domain formed by this component would not give any block copolymer of satisfactory strength. Further, in cases where a component segment having the cation or anion exchange group eventually becomes less than 5%, the advantageous features and effects expected from an amphoteric ion exchanger would be lowered to a great extent.

As mentioned in the foregoing, the amphoteric ion exchanger according to the present invention is obtained by carrying out hydrolyzing, sulfonating and quaternizing treatments on an original multi-block copolymer which is prepared by an ordinary living anion polymerization after it has been processed into a desired shape. If necessary, the poly-diene segment portion of the multi-block copolymer forming the neutral domain thereof may be crosslinked. In an example of the process for obtaining an original multi-block copolymer, a known butyl lithium (including n, sec, tert, etc.), 2-methyl butyl lithium or sodium naphthalene, sodium anthracene, sodium α-methyl-styrene tetramer, sodium biphenyl or the like is used as initiator of the living anion polymerization. Then, the polymerization is carried out under a vacuum or under an inert gas atmosphere such as nitrogen gas, argon gas or the like in an aromatic hydrocarbon, cyclic ether, or an aliphatic hydrocarbon generally selected from the group consisting of benzene, toluene, tetrahydrofuran, n-hexane, etc. to obtain the original multiblock copolymer.

After or concurrently with processing this original multi-block copolymer into a powdery or film shape or into any other desired shape, the nitrogen portion thereof is either quaternized or made into a tertiary ammonium salt. Following this, sulfonation of an aromatic ring, hydrolysis of carboxylic acid ester, etc. are carried out. The quaternization of nitrogen is carried out by a reaction with an alkyl halide in accordance with a known method. However, use of a solvent containing an alkyl halide permits quaternization simultaneously with preparation of a membrane. The swollen state of a component segment having a quaternary amine varies with the carbon number of the quaternization reagent. This can be utilized for controlling the moisture content of the whole membrane. It is also effective to make the nitrogen portion into a tertiary ammonium salt by means of hydrochloric acid, etc.

The sulfonation of an aromatic ring can be carried out in accordance with a known process with concentrated sulfuric acid, fuming sulfuric acid, sulfur trioxide, chlorosulfonic acid, etc. as described n "SHIN JIKKEN KAGAKU KOZA" (Lectures on Experimental Chemistry), Vol. 14-III, p 1776. Meanwhile, the hydrolysis of carboxylic acid ester can be carried out with an aqueous solution of sodium hydroxide or the like also in accordance with a known process.

When the diene component of the original multi-block copolymer before introduction of ion exchange groups thereinto and the amine portion of the multi-block copolymer after quaternization of the amino group thereof are subjected to being dyed with osmium tetroxide and being dyed with tangsto-phosphoric acid respectively, the three kinds of domains, which result in micro-phase separation, are readily discernible from each other by means of a transmission electron microscope. Further, in the case of a sample obtained through introduction of anion and cation exchange groups and a linking process, the micro-phase separated structure is also observable by a transmission type electron microscope after the sample has been immersed in an aqueous solution of 2% osmium tetroxide.

The invention will be understood more fully from the following description of embodiment examples thereof:

EXAMPLES 1-3

Using sec-butyl lithium as initiator, styrene, p-vinyl benzyl dimethyl amine (hereinafter will be called p-VBDA) and isoprene were polymerized one after another in benzene in the order of isoprene, styrene, isoprene, p-VBDA and isoprene by a five stage sequential addition. Before polymerization, the styrene was dried with calcium hydride and distilled under reduced pressure. After that, the styrene was further purified with benzophenone sodium and then was vacuum distilled. The isoprene was distilled after it was dried with calcium hydride and sodium. The p-VBDA was dried with calcium hydride and distilled under reduced pressure. After that, the p-VBDA was purified with a triphenyl methyl lithium-lithum bromide system and vacuum distilled. Benzene was distilled with addition of n-butyl Litium after usual purification through a sodium mirror.

The concentration of the initiator and the weight of each monomer employed were varied and three samples of different molecular weight values and different compositions were obtained as samples T-1, T-2 and T-3 as shown in Table 1.

In every sample thus polymerized, number-average molecular weight values $\overline{M_n}$ obtained by an osmometric method for CA precursors (intermediate polymer products of isoprene and styrene), CACB precursors (intermediate polymer products of isoprene, styrene, isoprene and p-VBDA) and the final polymer products well coincided with values computed from the amounts of the initiator and those of the monomers used. This fact indicates that the block copolymerization of original block copolymers of the desired CACBC type was successfully accomplished.

Figure 2:
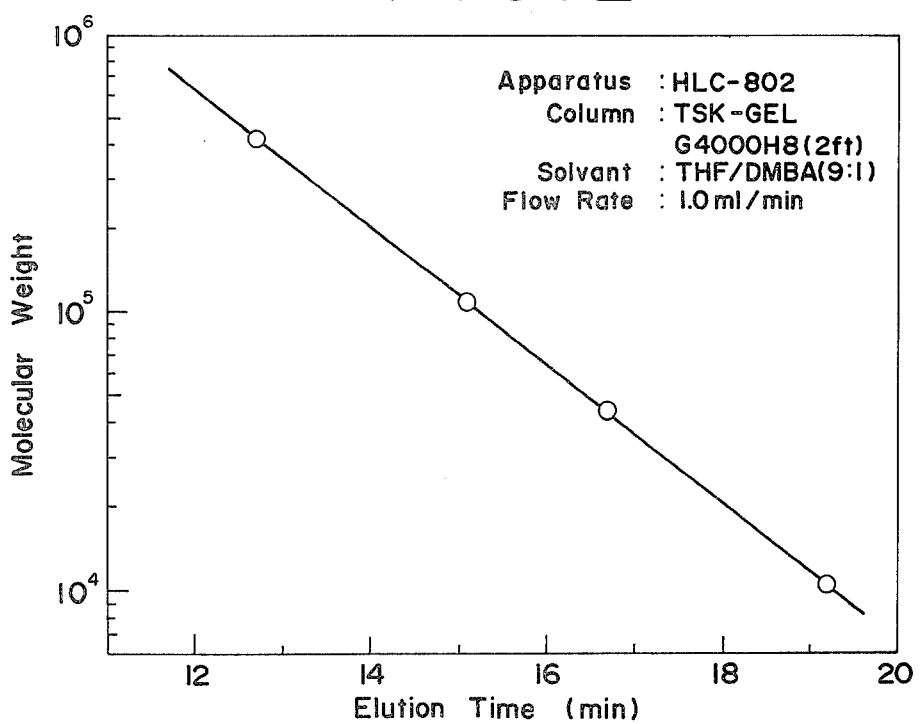
FIG. 2 is a graph showing a calibration curve of a GPC apparatus obtained using a standard polystyrene sample. In this graph, molecular weight is plotted on the ordinate and elution time on the abscissa.
Figure 3:
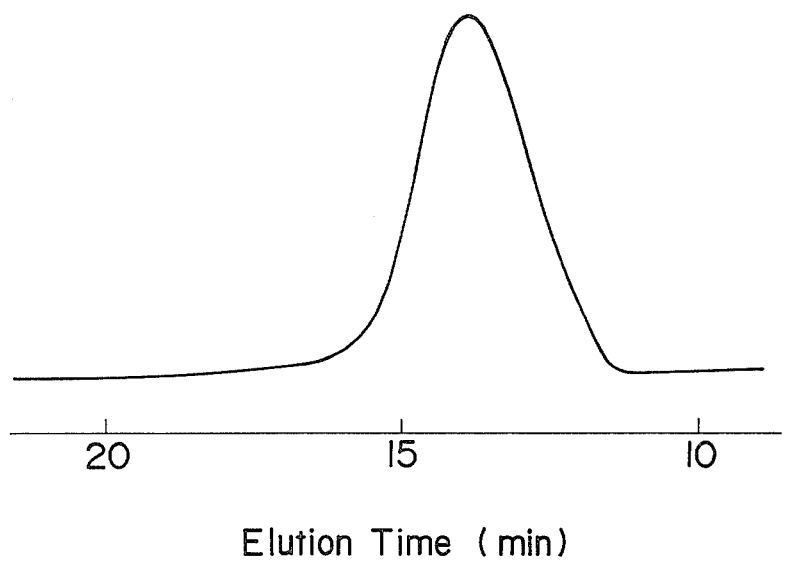
FIG. 3 is a graph showing a GPC elution curve of the sample T-3.

As shown in FIG. 1, a sample T-3 which was one of these original block copolymers had a narrow sedimentation pattern. Further, for the same material, GPC measurement was carried out with a GPC column G4000 $H_8$ made by Toyo Soda Co. (measuring 60 cm in length and 7.5 cm in inner dia.) using, as eluent, tetrahydro furan which contained 10% of N,N-dimethyl benzyl amine (DMBA). FIG. 2 shows a calibration curve of the GPC apparatus obtained by using standard polystyrene samples mady by Toyo Soda. FIG. 3 shows an elution curve of the sample T-3. It is apparent from the sedimentation pattern and the GPC curve that the original block copolymer T-3 had considerably narrow molecular weight distribution leaving no intermediate polymerization product therein. Results of measurement similar to those of the sample T-3 were also obtained for other samples T-1 and T-2.

Figure 4:
FIG. 4 is a photo taken by a transmission electron microscope, representing a film which is obtained from a benzene solution of the sample T-3 and dyed with osmium tetroxide.

A film measuring about 50 μm in thickness was prepared from a benzene solution of the above stated sample T-3. The film was dyed with osmium tetroxide. A photograph of the film was taken by a transmission electron microscope. FIG. 4 represents the photograph, which clearly shows a domain consisting of styrene (white parts), a domain consisting of isoprene (black parts) and another domain consisting of p-VBDA (light black parts). These three phases respectively measure 100 Å to 150 Å or thereabout in width. It is also clearly shown that the styrene domain and the p-VBDA domain are separated from each other by the isoprene domain. Results similar to this were obtained also from films of other samples T-1 and T-2.

Each of the films which were prepared from benzene solutions of these three kinds of samples and which measured 50 μm in thickness was processed to have the amine portion thereof quaternized in a methyl iodide vapor. Then, the isoprene portion of the sample was crosslinked through a nitromethane solution of sulfur monochloride of 20% volume concentration. Following that, the styrene portion of the sample was sulfonated through a 2% chloroform solution of chlorosulfonic acid to obtain an amphoteric ion exchanger. The film remained unbroken and undamaged through these steps of chemical treatment. A final membrane product thus obtained was subjected to a water permeation test. Then, a flux of 0.02 $cm^3/cm^2$ min was obtained at pressure of 38 $kg/cm^2$. The test result indicated that the membrane had no crack and no pinhole.

The micro-structure of the film was examined with a transmission electron microscope at every step of the chemical treatment. The results of observation with the electron microscope indicated that the micro-structure of the original films remained unchanged and was left intact in the cases of the samples T-2 and T-3. Meanwhile, in the case of the sample T-1 wherein molecular weight was relatively large, some changes were observed in the micro-structure of the sample after quaternization and sulfonation.

After each of the samples was quaternized by the process described above, results of the quantitative determination of the iodine contained in the film thereof indicated that the amino group of the sample was quaternized nearly 100%. Further, after the crosslinking and sulfonation processes, each of the films was immersed in 3.5 normal brine over a period of 20 hours at 50° C. and then was washed with water. From the quantity of sodium contained in the film which had been thus processed, it was ascertained that there was included one sulfonic acid group per unit of styrene.

EXAMPLES 4 and 5

Block copolymerization of the CACBC type was carried out in the same manner as in Examples 1–3 with the exception of that the isoprene which was one of the monomers and formed the neutral domain was replaced with butadiene in Examples 4 and 5.

The mol quantities of the initiator, the amounts of the monomer put in at each step of polymerization and the $\overline{Mn}$ values of the intermediate polymer products (CA precursors) of butadiene and styrene, the intermediate polymer products (CACB precursors) of butadiene, styrene, butadiene and p-VBDA and the final polymer products were as shown in Table 1 at samples T-4 and T-5. The results of a sedimentation experiment and GPC measurement indicated that the molecular weight distribution of these samples 4 and 5 are also narrow in about the same degree as the samples 1, 2 and 3 of Examples 1–3.

Each of films prepared from a benzene solution also showed micro-phase separated structure in the same manner as in the preceding examples. Amphoteric ion exchangers were obtained through quaternization, crosslinking and sulfonation treatments which were also carried out under the same conditions as in the preceding examples. The micro-structure of the samples remained unchanged by these chemical treatments.

EXAMPLE 6

Block copolymerization was carried out with n-butyl lithium used as initiator in benzene purified through a sodium mirror in the order of cyclohexadiene, vinyl toluene, cyclohexadiene, p-vinyl phenyl ethyl diethyl amine and cyclohexadiene to obtain a sample T-6 as shown in Table 1. According to GPC data, the molecular weight distribution of this sample was a little wider than that of Examples 1–5. However, the film obtained from this sample showed a micro-phase separated structure consisting of three phases. The film remained unbroken and undamaged through the chemical treatments carried out for quaternizing, sulfonating, etc. to obtain an amphoteric ion exchanger.

EXAMPLE 7

Block copolymerization of the ACB type was carried out in benzene with sec-butyl lithium used as initiator with 12.4 g of styrene, 9.7 g of isoprene and 13.3 g of p-VBDA put in in the order of styrene, isoprene and p-VBDA. The quantity of the initiator was $2.15 \times 10^{-4}$ mol. The values of $\overline{Mn}$ of the intermediate polymer product of styrene, the intermediate polymer product of styrene and isoprene and the final polymer product thus obtained were respectively $5.9 \times 10^4$ g/mol, $9.9 \times 10^4$ g/mol and $1.64 \times 10^5$ g/mol which approximately coincided with computed values. Further, the results of GPC measurement indicated that the molecular weight distribution of this sample was considerably narrow.

Figure 5:
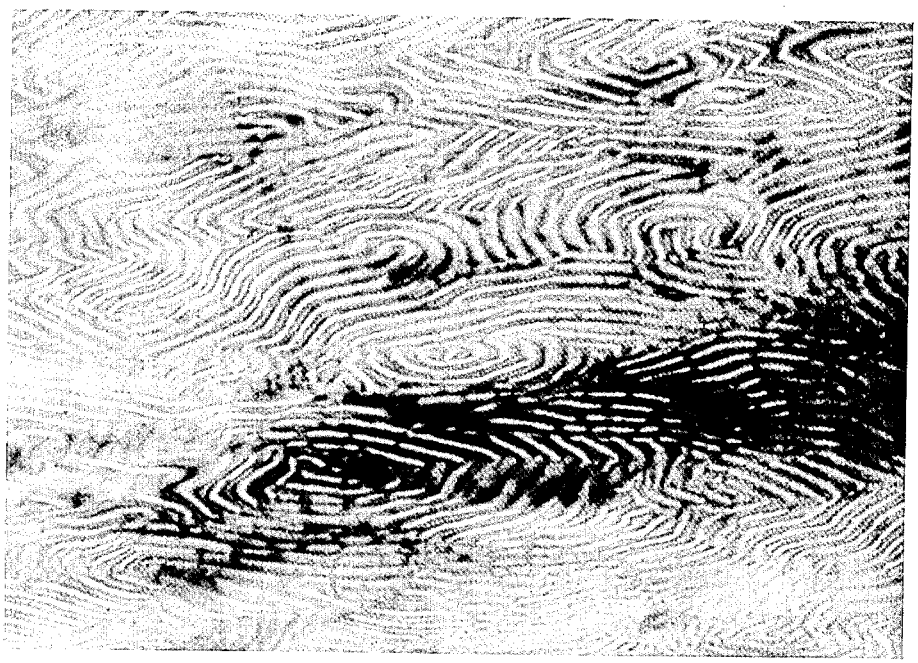
FIG. 5 is a photo taken by a transmission type electron microscope representing a film which is obtained from a benzene solution of an ACB type block copolymer consisting of styrene, isoprene and p-VBDA (p-vinyl benzyl dimethyl amine) and then is dyed with osmium tetroxide.
Figure 6:
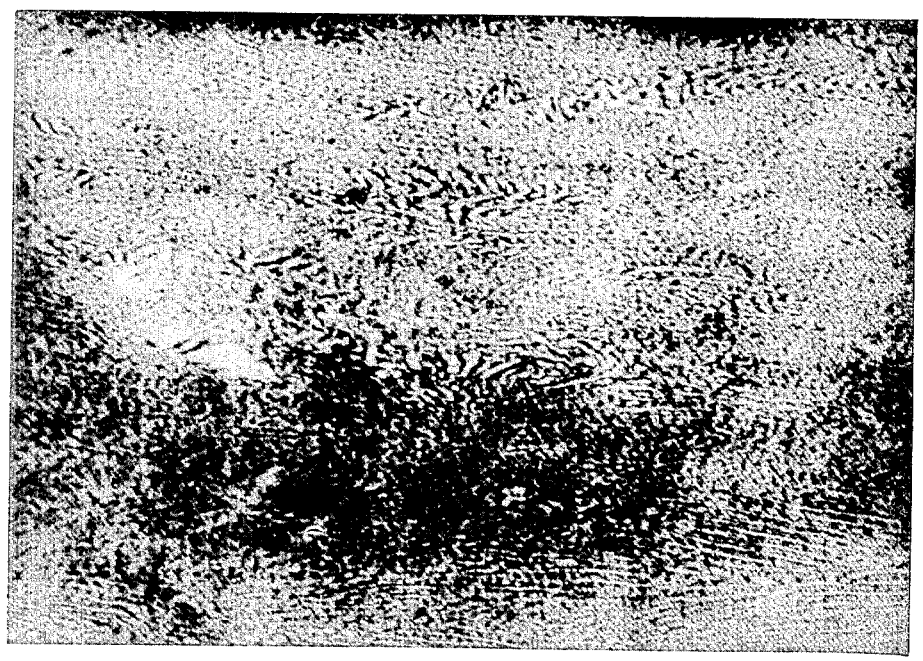
FIG. 6 is a photo taken also by a transmission microscope, representing a film which is obtained from the same sample as that of FIG. 5; is treated with methyl iodide; and then is dyed with osmium tetroxide.

A film was prepared from a benzene solution of this sample. After this film had been dyed with osmium tetroxide, a photograph thereof was taken with a transmission type electron microscope as represented by FIG. 5. The photograph shows a micro-phase separated structure in which a styrene domain and an amine domain are separated from each other by an isoprene domain in the same manner as in the case of the sample of the CACBC type. However, in the case of this ACB type sample, the micro-structure of the original film thereof was changed to a considerable extent when the amine portion thereof was quaternized in the vapor of methyl iodide as shown in FIG. 6. Further, when a sulfonating reaction was carried out under the same conditions as in Examples 1, 2 and 3 after the isoprene portion was crosslinked, the film tended to have flaws such as cracks. These facts indicate that the sample of the ACB type was weaker than the sample of the CACBC type.

COMPARISON EXAMPLE 1

Using sec-butyl lithium as initiator, polymerization was carried out in benzene in the order of styrene, p-VBDA and isoprene to obtain a block copolymer of the ABC type. The weights of the monomers and the mol number of the initiator were the same as those of Example 7. A film which was prepared from a benzene solution of this sample was dyed with osmium tetroxide and was examined with a transmission electron microscope. Through this, it was confirmed that the film had a three-phase lamellar structure consisting of a repeating unit which was composed of and in the order of a styrene domain, an amine domain and an isoprene domain.

Further, quaternizing, crosslinking and sulfonating treatments were carried out on the film in the same manner as in Examples 1–3. The treated film was examined again with the transmission electron microscope in the same manner. It was then found that the original micro-structure of the film had been completely disordered. Besides, the film had insufficient strength, which made it difficult to prevent it from being broken during the above stated chemical treatments.

TABLE 1

Example 1–6
Block Copolymerization of CACBC Type Pentamerous Copolymer

| Sample code | Amounts of initiator $\times 10^4$ (mol) | Amounts of monomers (g) | | | | | $\overline{Mn} \times 10^{-4}$ (g/mol) | | |
|---|---|---|---|---|---|---|---|---|---|
| | | C | A | C | B | C | CA precursors | CACB precursors | Final polymers |
| T-1 | 0.792 | 6.32 | 12.8 | 5.98 | 24.4 | 5.78 | 23.0 (24.1) | — (62.6) | — (69.9) |
| T-2 | 1.92 | 6.8 | 17.4 | 6.8 | 17.0 | 6.1 | 12.1 (12.7) | 23.8 (25.1) | 29.1 (28.3) |
| T-3 | 3.43 | 7.3 | 14.4 | 7.1 | 25.0 | 6.9 | 6.6 (6.1) | 16.7 (15.7) | 17.7 (17.7) |
| T-4 | 1.16 | 7.6 | 11.4 | 7.5 | 11.2 | 7.6 | 15.8 (16.5) | 31.0 (32.7) | 39.0 (39.3) |
| T-5 | 2.63 | 4.5 | 19.5 | 3.7 | 19.3 | 4.3 | 8.4 (9.1) | 18.1 (18.0) | 19.4 (19.4) |

TABLE 1-continued

Example 1-6
Block Copolymerization of CACBC Type Pentamerous Copolymer

| Sample code | Amounts of initiator × 10$^4$ (mol) | Amounts of monomers (g) | | | | | Mn × 10$^{-4}$ (g/mol) | | |
|---|---|---|---|---|---|---|---|---|---|
| | | C | A | C | B | C | CA precursors | CACB precursors | Final polymers |
| T-6 | 2.21 | 5.3 | 7.3 | 5.0 | 20.4 | 4.3 | 5.6 (5.7) | — (17.1) | — (19.0) |

Note:
The values inside ( ) indicate molecular weight computed from the amounts of monomers and initiator.

What is claimed is:

1. An amphoteric ion exchanger consisting of a macro-molecular chain A$^-$ having a cation exchange group, a macro-molecular chain B$^+$ having an anion exchange group and a macro-molecular chain C having no ion exchange group, said chains being linked together into a straight chain in such a manner that the macro-molecular chains A$^-$ and B$^+$ are not adjoining each other; each of said macromolecular chains A$^-$ and B$^+$ being at least 5% by weight of the amphoteric ion exchanger and said macromolecular chain C having no ion exchange group being 30–90% by weight of the amphoteric ion exchanger, said weights being on an ion exchange group-free basis.

2. An amphoteric ion exchanger according to claim 1, wherein said macro-molecular chain C which has no ion exchange group is located at both ends of said straight chain constituting the ion exchanger.

3. An amphoteric ion exchanger according to claim 1 or 2, wherein the cation exchange group of said macro-molecular chain A$^-$ is a carboxyl group and/or sulfonic acid group.

4. An amphoteric ion exchanger according to claim 3, wherein the anion exchange group of said macro-molecular chain B$^+$ is a quaternized ammonium salt.

5. An ion exchanger obtained from an original multi-block copolymer wherein a macro-molecular block A which is capable of having a cation exchange group, a macro-molecular block B which is capable of having an anion exchange group and a macro-molecular block C which is not allowed to have any ion exchange group are linked into a straight chain in such a way as to have said blocks A and B not adjoining each other, said ion exchanger being prepared by treating said original multi-block copolymer through a process of introducing a cation exchange group into the macro-molecular block A to make the block A into a macro-molecular chain A$^-$ which has the cation exchange group; a process of introducing an anion exchange group into the macro-molecular block B to make the block B into a macro-molecular chain B$^+$ which has the anion exchange group; and another process of crosslinking the macro-molecular block C to make the block C into a macro-molecular chain C which has no ion exchange group, said macro-molecular chain A$^-$ which has the cation exchange group and said macro-molecular chain B$^+$ which has the anion exchange group being separated from each other by said macro-molecular chain C which has no ion exchange group.

6. An ion exchanger according to claim 5, wherein said macro-molecular block C which is not allowed to have any ion exchange group is located at both ends of said original multi-block copolymer and thus said macro-molecular chain C which has no ion exchange group is located at both ends of said ion exchanger.

7. An ion exchanger according to claim 5 or 6, wherein, in said original multi-block copolymer, the ratio by weight of said macro-molecular block C which is not allowed to have any ion exchange group is 30–90% of the total original multi-block copolymer.

8. An ion exchanger according to claim 7, wherein, in said original multi-block copolymer, the ratio by weight of each of said macro-molecular block A which is capable of having a cation exchange group and said macro-molecular block B which is capable of having an anion exchange group is at least 5% of the original multi-block copolymer.

9. An ion exchanger according to claim 5, wherein, in said original multi-block copolymer, the molar mass per block of each of said macro-molecular block A which is capable of having a cation exchange group, said macro-molecular block B which is capable of having an anion exchange group and said macro-molecular block C which is not allowed to have any ion exchange group is $10^3$ g/mol to $5 \times 10^5$ g/mol.

10. A method for manufacturing an ion exchanger consisting of a macro-molecular chain A$^-$ which has a cation exchange group, a macro-molecular chain B$^+$ which has an anion exchange group and a macro-molecular chain C which has no ion exchange group with said chains A$^-$ and B$^+$ being separated from each other by said chain C, said method comprising the steps of:

obtaining an original multi-block copolymer from a monomer capable of forming a macro-molecular block A which is capable of having a cation exchange group through polymerization, a monomer capable of forming a macro-molecular block B which is capable of having an anion exchange group through polymerization and a monomer capable of forming a macro-molecular block C which is not allowed to have any ion exchange group through polymerization, said original multi-block copolymer being obtained in accordance with a living anion polymerization process by block copolymerizing said monomers one after another into a straight chain in such a way as to have the macro-molecular block A which is capable of having a cation exchange group and the macro-molecular block B which is capable of having an anion exchange group separated from each other by the macro-molecular block C which is not allowed to have any ion exchange group;

introducing a cation exchange group into the macro-molecular block A of the original multi-block copolymer to make the block A into a macro-molecular chain A$^-$ having the cation exchange group;

introducing an anion exchange group into the macro-molecular block B of the original multi-block copolymer to make the block B into a macro-molecular chain B$^+$ having the anion exchange group; and crosslinking the macro-molecular block C of the original multi-block copolymer to make the block C into a macro-molecular chain C having no ion exchange group.

11. A method according to claim 10, wherein said monomer capable of forming the macro-molecular block A which is capable of having cation exchange groups through polymerization is either an unsaturated carboxylic acid ester or a monomer having a cyano group, which forms a carboxyl group through hydrolysis or an aromatic vinyl compound which can be sulfonated.

12. A method according to claim 10 or 11, wherein said monomer capable of forming the macro-molecular block B which is capable of having anion exchange groups through polymerization is either a vinyl compound having a heterocyclic ring containing nitrogen which can be readily quaternized or a monomer which can be expressed by the following formula:

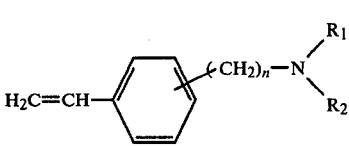

wherein $n=1-3$; and $R_1$ and $R_2$ respectively represent alkyl groups of carbon numbers 1-12.

13. A method according to claim 12, wherein said monomer capable of forming a macro-molecular block C which is not allowed to have any ion exchange group is a diene.

14. A method according to claim 10, including a step of making said macro-molecular block A into said macro-molecular chain $A^-$ by subjecting the block A either to a hydrolyzing treatment or a sulfonating treatment; a step of making said macro-molecular block B into said macro-molecular chain $B^+$ by subjecting the block B to a quaternizing treatment; and a step of making said macro-molecular block C into said macro-molecular chain C by crosslinking the block C.

* * * * *